(12) United States Patent
Fritz et al.

(10) Patent No.: US 7,792,620 B2
(45) Date of Patent: Sep. 7, 2010

(54) DRIVING DYNAMICS CONTROL ADAPTED TO DRIVING CONDITIONS AND BASED ON STEERING INTERVENTIONS

(75) Inventors: Stefan Fritz, Erzhausen (DE); Matthias Muntu, Hofheim (DE); Thomas Raste, Oberursel (DE); Urs Bauer, Ludwigsburg (DE); Peter Cisarz, Hofheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 11/921,264

(22) PCT Filed: Jun. 2, 2006

(86) PCT No.: PCT/EP2005/062894

§ 371 (c)(1),
(2), (4) Date: Jun. 12, 2009

(87) PCT Pub. No.: WO2006/128916

PCT Pub. Date: Dec. 7, 2006

(65) Prior Publication Data

US 2009/0306856 A1 Dec. 10, 2009

(30) Foreign Application Priority Data

Jun. 2, 2005 (DE) .................. 10 2005 025 287

(51) Int. Cl.
*G06F 17/00* (2006.01)
*G06F 19/00* (2006.01)

(52) U.S. Cl. .................. 701/42; 701/41; 701/33; 701/36; 180/204; 180/6.2

(58) Field of Classification Search .................. 701/29, 701/33, 36, 41, 42; 180/6.2, 6.24, 204, 443
See application file for complete search history.

(56) References Cited

U.S. PATENT DOCUMENTS

| 6,895,318 | B1 | 5/2005 | Barton et al. | |
|---|---|---|---|---|
| 2003/0149515 | A1* | 8/2003 | Hessmert et al. | 701/29 |
| 2005/0043874 | A1 | 2/2005 | Chen et al. | |
| 2007/0150116 | A1* | 6/2007 | Schwarz et al. | 701/1 |

FOREIGN PATENT DOCUMENTS

| DE | 4419131 | 12/1994 |
|---|---|---|
| DE | 19515059 | 5/1996 |
| DE | 10032340 | 1/2002 |
| DE | 10141273 | 3/2003 |
| DE | 10341412 | 1/2005 |
| WO | 2005047086 | 5/2005 |

* cited by examiner

*Primary Examiner*—Gertrude Arthur Jeanglaud

(57) ABSTRACT

A device for controlling the driving dynamics of a vehicle senses at least one driving condition variable being representative of a driving condition and has a driving dynamics controller for determining an additional steering angle, according to which a steering motion can be carried out in addition to the steering motion commanded by an operator. The driving dynamics controller (100, 110) has at least two control units (340, 350), which are respectively associated with one driving condition range. It includes a determinator for determining a prevailing driving condition, in which the prevailing driving condition can be established based on the driving condition variable ($\dot{\Psi}$, $\beta$, $a_y$), and in that it includes an activation logic (360) being in connection with the determination means and being adapted to enable a control unit (340, 350), which is associated with the established driving condition range.

20 Claims, 6 Drawing Sheets

DRIVING DYNAMICS CONTROL ADAPTED TO DRIVING CONDITIONS AND BASED ON STEERING INTERVENTIONS

BACKGROUND OF THE INVENTION

The present invention relates to a device for controlling the driving dynamics of a vehicle, with means for sensing at least one driving condition variable being representative of a driving condition, and with a driving dynamics controller for determining an additional steering angle, according to which a steering motion can be carried out in addition to the steering motion commanded by an operator. The invention further relates to a method of controlling the driving dynamics, for implementation of which the device is well suited.

To influence the horizontal dynamics of a vehicle, control systems are nowadays employed, which usually make interventions into the brake system and the engine management of the vehicle based on yaw rate control. However, these interventions cause a vehicle deceleration and fluctuations in the longitudinal force, which are distinctly noticeable to the operator and therefore, for comfort reasons, can only be used in situations being critical with regard to driving dynamics in order to stabilize the vehicle.

It is principally also feasible, however, that driving dynamics control is performed in the range of uncritical driving conditions in order to improve handling of the vehicle and enhance its agility. Steering interventions have proven to be suitable in this connection, where steering motions are carried out by means of a so-called active steering irrespective of the driver, which the operator does not perceive as impairing the comfort.

A driving dynamics control based on steering interventions is in a position to adjust vehicle instabilities by control in the range of critical driving conditions as well as to improve the driving performance of the vehicle in the range of uncritical driving conditions, which will be referred to as range of handling in the following. The demands placed on the control system differ, however, considerably in the different driving condition ranges.

In view of the above, an object of the invention is to provide a device for controlling the driving dynamics of a vehicle as well as a method for controlling the driving dynamics of a vehicle, wherein the steering interventions can be adapted to the prevailing driving conditions range as optimally as possible.

SUMMARY OF THE INVENTION

According to the invention, this object is achieved in that the device for controlling the driving dynamics of a vehicle at least two control units, which are respectively associated with a vehicle condition range, that the device includes a determination means for determining a prevailing driving condition in which the prevailing condition can be established based on the driving condition variable, and that the device includes an activation means that is in connection with the determination means and allows enabling a control unit, which is associated with the established driving condition range.

Furthermore, this object is achieved in that in the method the additional steering angle is determined in at least two control units, that based on the driving condition variable a driving condition range is established and that in each case the control unit is enabled, which is associated with the established driving condition range. After the enablement, the correcting variable defined by the corresponding control unit can be transmitted to the actuator system.

The invention renders it possible to provide different control units for establishing the additional steering angle, which are adapted in each case to a defined driving condition range. The enablement of the different control units in the driving condition ranges associated with them is performed by the activation means, which resorts to the results of a driving condition range determination for this purpose.

Advantageously, a control system and a control method are thus provided, which can be adapted optimally to the different requirements that exist in the different driving condition ranges. In addition, the control system has an especially simple structure. Hence, it is especially simple to make and to adapt to the specific field of application, in particular to the specific type of vehicle wherein it shall be employed.

A driving condition range implies in particular a predefinable quantity of driving conditions within the limits of the invention. The driving condition ranges are e.g. characterized by predetermined threshold values of one or more driving condition variables.

In this respect, it has proven to be especially favorable that a difference is made between at least one range of handling and one range of critical driving conditions, in which different control objectives are predetermined in each case.

In a preferred embodiment of the invention, a first control unit of the driving dynamics controller is therefore associated with the range of handling, while a second control unit is associated with the range of critical driving conditions.

The control objective in the range of handling is to minimize the phase delay, which develops due to the elasticity of chassis elements and the vehicle inertia between the steering specification of the operator and the reaction of the vehicle.

To achieve this aim, it has turned out to be especially favorable that the first control unit comprises a pilot control component, in which a closed-loop control portion of the additional steering angle can be determined depending on a yaw rate reference value that is established in a first vehicle model.

It has proven to be advantageous that the first vehicle model is a steady-state vehicle model, meaning a vehicle model, in which the vehicle inertia is not taken into consideration.

In a model of this type, there is no phase delay between the steering specification of the driver and the reference yaw rate signal so that it can be employed especially well in the range of handling with regard to the control objective mentioned hereinabove.

In order to take the vehicle reaction also into consideration during the controlling interventions in the range of handling, it is furthermore especially expedient that the first control unit comprises a control component in which a controlling portion of the additional steering angle can be determined depending on a difference between a yaw rate actual value and the yaw rate reference value that is established in the first vehicle model.

Preferably, the additional steering angle that can be determined in the first control unit is a sum of the closed-loop control portion and the open-loop control portion, with the closed-loop control portion representing a larger share in the sum than the controlling portion Advantageously, the additional steering angle is thus determined by the closed-loop control portion to a large degree.

In a preferred embodiment of the invention, the second control unit comprises a control component, in which a controlling portion of the additional steering angle can be determined depending on a difference between the yaw rate actual value and a yaw rate reference value, with the yaw rate reference value being established in the first or in a second vehicle model.

Favorably, there is also provision of a third control unit, which determines a brake force on at least one wheel brake of the vehicle and/or an engine torque of a driving engine of the vehicle depending on a difference between the yaw rate actual value and the yaw rate reference value that is established in the second vehicle model.

This third control unit essentially corresponds to a conventional standard ESP system, which can be integrated into the invention for further improving the driving stability in the range of critical driving conditions.

The second vehicle model preferably concerns a dynamic vehicle model, implying in particular a model that considers the vehicle inertia. Compared to a steady-state vehicle model, a dynamic vehicle model allows exactly establishing the actual vehicle performance, and it is therefore especially well suited for an application in the range of critical driving conditions.

In a preferred embodiment of the invention, it is arranged that the determination means determines the prevailing vehicle condition based on a comparison between a deviation of at least one actual value of the driving condition variable from a reference value of the driving condition variable and at least one predetermined first threshold value, and/or based on a comparison between at least one actual value of the driving condition variable and at least one predetermined second threshold value.

It is especially suitable that the determination means detects a driving condition in the range of handling when the magnitude of the difference between the actual value of the driving condition variable and the reference value is lower than the predetermined first threshold value and/or when the magnitude of the driving condition variable is lower than the predetermined second threshold value.

It is furthermore especially suitable that the determination means detects a driving condition in the range of critical driving conditions when the magnitude of the difference between the actual value of the driving condition variable and the reference value is higher than the predetermined first threshold value and/or when the magnitude of the driving condition variable exceeds the predetermined second threshold value.

Furthermore, it has proven to be favorable that the reference value of the driving condition variable, which is used when establishing the driving condition, is calculated in the second vehicle model. Thus, the reference model is concerned, which is also the basis for the detection of the prevailing driving condition and its allocation to a driving condition range, respectively.

In particular when using the second vehicle model for calculating the reference value of the driving condition variable, which is made the basis in establishing the driving condition, inadvertent controlling interventions by the controllers being active in the range of critical driving conditions might occur, however, due to the controlling interventions in the range of handling.

Therefore, it is provided in a favorable embodiment of the invention that the reference value of the driving condition variable, which is used in the determination of the prevailing driving condition, is calculated in the presence of a driving condition in the range of handling depending on a sum of the steering angle specification of the operator and the additional steering angle.

This takes into account the controlling interventions in the vehicle condition analysis and avoids unwanted stabilizing controlling interventions in the range of handling.

Further advantages, special features, and favorable improvements of the invention can be taken from the subsequent illustration of preferred embodiments by way of the Figures.

DETAILED DESCRIPTION OF THE DRAWINGS

Figure 1:
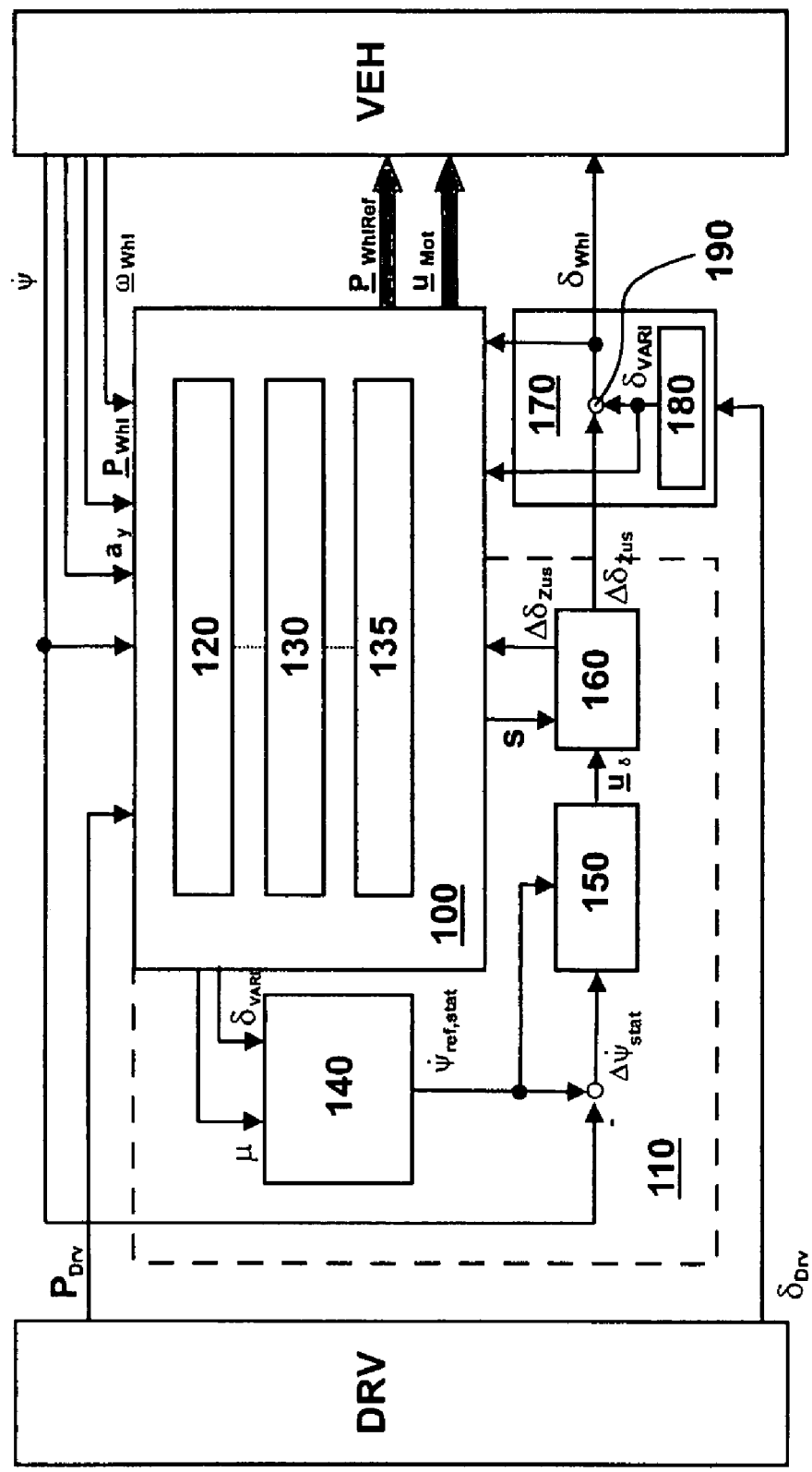
FIG. 1 is a block diagram of a control system for driving dynamics control with a standard ESP system and a control system for determining and adjusting an additional steering angle.

FIG. 1 shows in particular a block diagram of a driving dynamics controller, which comprises a control system 110 (shown in dotted lines in the Figure) for establishing the additional steering angle $\Delta\delta_{Zus}$ in addition to a standard ESP system 100. It is also illustrated, which input variables of the driving dynamics controller are predetermined by the operator (shown by block 'DRV' in FIG. 1) and which input variables are sensed by sensors of the vehicle (shown by block 'VEH' in FIG. 1).

The driving dynamics controller can be realized as hardware or as a software program, which is stored and performed in a control unit of the vehicle.

The standard ESP system 100 is principally known to the expert in the art. It comprises especially a block 120, in which a reference yaw rate $\dot{\Psi}_{ref,dyn}$ is calculated. The calculation is based on a dynamic vehicle model, as it has been described in German published patent application DE 195 15 059 A1, for example, and it will be referred to later on, which input parameters are used for the model.

Based on the control deviations $\Delta\dot{\Psi}_{dyn}$ between the reference yaw rate $\dot{\Psi}_{ref,dyn}$ and the actual yaw rate $\dot{\Psi}$ of the vehicle A, which is measured for example by means of a yaw rate sensor, a yaw rate controller in block 130 determines a set of wheel-individual brake pressures $\underline{P}_{Whlref}$ as well as a set of engine parameters $\underline{u}_{Mot}$ for stabilizing brake and/or engine interventions, which are transformed into corresponding adjustment requirements in block 135.

When determining the correcting variables, preferably, also those vehicle condition variables such as the lateral acceleration $a_y$ acting on the vehicle and the set of wheel rotational speeds $\underline{\omega}_{Whl}$, from which the vehicle speed v can be established, and operating parameters of the vehicle such as the brake pressure $P_{Drv}$ set by the operator, are taken into consideration. This can occur, for example, by an adaptation of the controller parameters.

Besides, the standard ESP system comprises an activation logic, which is not shown in FIG. 1, checking by way of an evaluation of the above-described input variables of the standard ESP system 100, whether a critical driving condition prevails, which necessitates a control by the system. In this case, the activation logic transmits the established adjustment requirements to the actuator system of the vehicle, which is provided for performing the correcting interventions; otherwise, the transmission is interrupted.

A critical driving condition is e.g. detected when the magnitude of the yaw rate deviation $\Delta\dot{\Psi}_{dyn}$ and/or the magnitude of the sideslip angle velocity $\dot{\beta}$ of the vehicle and/or the magnitude of the lateral acceleration $a_y$ exceed a predetermined threshold value in each case. The sideslip angle velocity $\dot{\beta}$ can then be calculated or estimated from the input variables in a way as described in German published patent application DE 195 15 059 A1.

The standard ESP system is supplemented by the control system 110 for determining an additional steering angle $\Delta\delta_{Zus}$. This system has a vehicle model of its own, in which a reference yaw rate $\dot{\Psi}_{ref,stat}$ is calculated in the block. The vehicle model, which will be referred to in detail hereinbelow, in particular is a steady-state vehicle model.

The yaw rate controller 150 determines directly from the reference yaw rate $\dot{\Psi}_{ref,stat}$ and from the deviation $\Delta\dot{\Psi}_{stat}$ between the reference yaw rate $\dot{\Psi}_{ref,stat}$ and the actual yaw rate $\dot{\Psi}$ of the vehicle the correcting variables $u_{HYC}$ and $u_{ESPII}$, which are combined to the variable $u_\delta = (u_{HYC}, u_{ESPII})$ in FIG. 1. This concerns requests for steering angle corrections, which are set at the steerable wheels of the vehicle in addition to the steering angle commanded by the operator. As will have to be explained more exactly in the following, the yaw rate controller 150 comprises two separate controllers, one of them calculating the correcting variable $u_{HYC}$ and the other one the correcting variable $u_{ESPII}$.

An activation logic in block 160 enables either the one or the other controller, and the correcting variable that is determined by the enabled controller is transmitted to the steering actuator 180 or to its control unit, while the correcting variable determined in the other controller is blocked though. Which one of the two correcting variables $u_{HYC}$ and $u_{ESPII}$ is relayed is determined by the activation logic from the result of the driving situation detection in the standard ESP system 100, which is provided by it in the form of a so-called flag S.

Flag S adopts the value 1 when the activation logic of the standard ESP system 100 has established the existence of a critical driving condition, necessitating an intervention of the standard ESP system. Otherwise the flap assumes the value 0.

The steering actuator 170 e.g. refers to an overriding steering system that uses a gear to intervene into the steering line of the vehicle and allows the superposition of an additional steering angle on the steering angle commanded by the driver, or the execution of an additional steering motion according to the additional steering angle, respectively.

In another embodiment of the invention, the steering actuator can also be a steer-by-wire steering system, in which the steering specifications of the operator are also transmitted as electronic signals to a control device, which will then set the desired steering angle at the steerable wheels of the vehicle. Herein, the electronic signal representative of the correcting variable defined by the control system 110 can be combined in a simple fashion with the steering specification of the operator.

In addition to setting the additional steering angle $\Delta\delta_{Zus}$, the steering actuator can be used to likewise realize the function of a variable speed-responsive steering ratio, wherein e.g. in the bottom speed range a very direct steering ratio is adjusted to facilitate maneuvering for the operator, while a very direct steering ratio is chosen in the top speed range in order to safeguard fail-free straight travel of the vehicle.

To this end, a steering angle $\delta_{VARI} = \ddot{u}_{VARI}(v)\delta_{Drv}$ or an additional steering angle $\Delta\delta_{VARI} = (1 - \ddot{u}_{VARI}(v))\delta_{Drv}$, respectively, is calculated in block 180 from the vehicle velocity v and the steering angle specification $\delta_{Drv}$ of the operator. The additional steering angle is then set at the steerable wheels of the vehicle in addition to the steering angle $\delta_{Drv}$ commanded by the operator. This is not shown in detail in the schematic view in FIG. 1, but it is assumed as a simplification that the steering actuator sets the steering angle $\delta_{VARI}$, superposed on which is the additional steering angle $\Delta\delta_{Zus}$ at the addition position 190 so that a steering angle $\delta_{Whl} = \delta_{VARI} + \Delta\delta_{Zus}$ is achieved at the steerable wheels of the vehicle.

Furthermore, the steering angle $\delta_{VARI}$ serves also as an input variable of the standard ESP system 100 as well as the control system 110. On the basis of this steering angle, the reference yaw rates $\dot{\Psi}_{ref,dyn}$ and $\dot{\Psi}_{ref,stat}$ are calculated in particular.

It is of course also possible to implement the invention without the function of the variable steering ratio. In this case, block 180 is omitted, and the steering angle specification of the operator is sent directly to the addition position 190, the standard ESP system 100, and the control system 110.

Further, the invention can be employed both in vehicles with a rear-wheel steering system and in vehicles with a front-wheel steering system. A combination of front-axle and rear-axle steering systems is likewise feasible for implementation of the invention.

The steering interventions of the control system 110 in the range of handling serve to improve the vehicle performance following an intervention and to enhance the agility of the vehicle thereby. The objective is to use the additional steering angle to compensate or minimize the phase delay between the steering motions of the operator and the reaction of the vehicle, the phase delay being due to the vehicle inertia and the elasticity of different chassis elements. The operator perceives this as a direct driving performance, enhancing the fun of driving he feels.

Figure 2A:
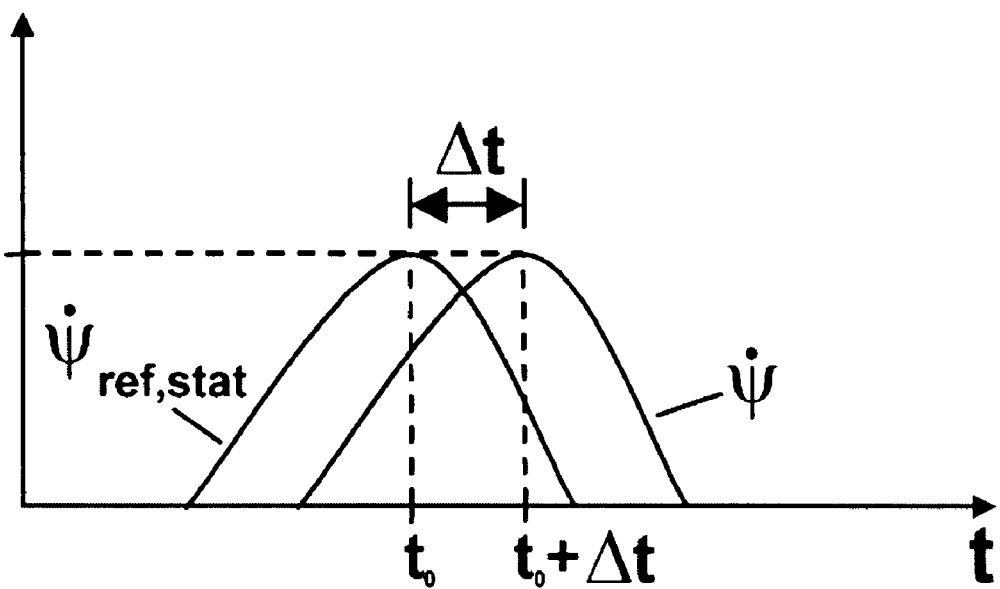
FIG. 2a is a diagram illustrating the time variation of the actual yaw rate and a reference yaw rate.

This phase delay becomes e.g. visible in the yaw rate variation illustrated in FIG. 2a. Herein, the measured actual yaw rate $\dot{\Psi}$ of the vehicle is plotted in a time diagram along with the reference yaw rate $\dot{\Psi}_{ref,stat}$. The reference yaw rate $\dot{\Psi}_{ref,stat}$ is calculated from the steering angle specification of the operator in a steady-state vehicle model and, thus, considers neither the vehicle inertia, nor the elasticity of chassis elements. It hence represents the yaw rate variation in a vehicle reacting ideally, i.e. without deceleration. Compared to the actual yaw rate $\dot{\Psi}$, a phase delay $\Delta t$ is achieved, which mirrors the deviation of the actual vehicle performance from the ideal performance.

In addition, the steering interventions in the range of handling also enhance the driving safety. If, for example, the operator is required to quickly avoid an obstacle, he generally tends to 'oversteering' due to the delayed vehicle reaction, that means, the operator sets so large steering angles that destabilization of the vehicle is imminent.

Figure 2B:
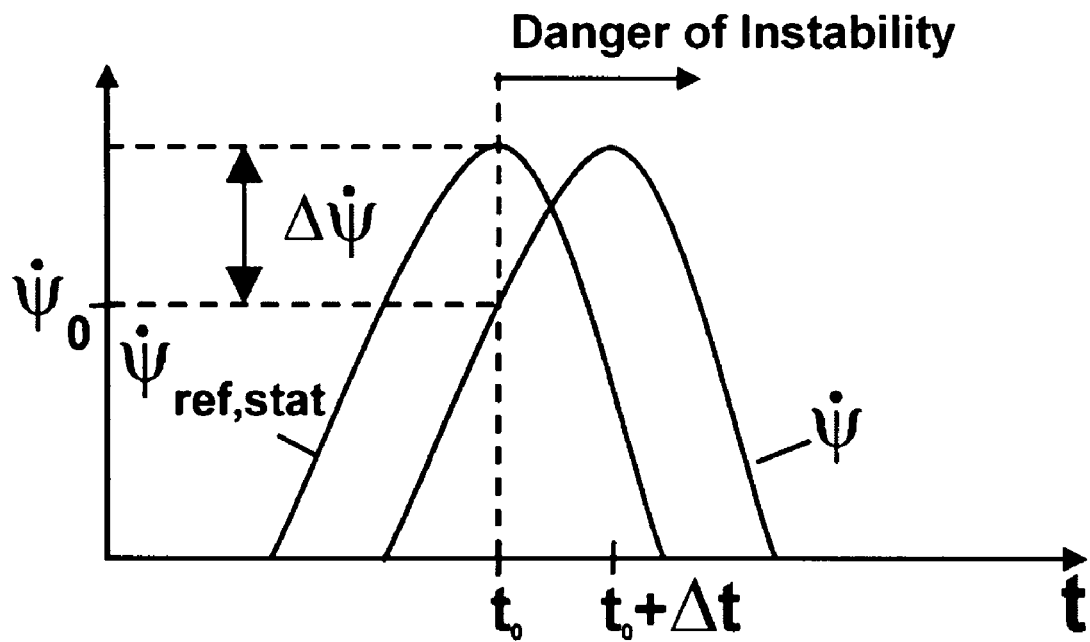
FIG. 2b is another diagram illustrating the time variation of the actual yaw rate and a reference yaw rate.

This is illustrated in FIG. 2b. It shows the time variations of the actual yaw rate $\dot{\Psi}$ and the reference yaw rate $\dot{\Psi}_{ref,stat}$, which develop in an obstacle-avoidance situation. To build up the yaw rate $\dot{\Psi}_0$ at time $t_0$, a steering angle must be set because of the delayed vehicle reaction, from which the yaw rate $\dot{\Psi}_0 + \Delta\dot{\Psi}$ results at time $t_0 + \Delta t$, unless the operator is quick enough to take countermeasures. However, the excessive yaw rate increase $\Delta\dot{\Psi}$ is frequently not expected by the operator, so that loss of control over the vehicle is impending.

Steering interventions in the range of handling that augment the agility render the vehicle easier to master in obstacle avoidance maneuvers, and the oversteering described is avoided in particular.

Furthermore, changed load conditions of the vehicle, the type of tire employed, and the wear condition of chassis elements can be taken into consideration by way of the steering interventions in the range of handling, and their influence on the vehicle behavior can be compensated. The steering interventions can also be used to apply a defined performance to the vehicle, which is predetermined by the vehicle manufacturer, for example. This can be achieved in a simple fashion in that the controller parameters of the control system 110 are adapted to the desired performance.

In the range of critical driving conditions, the purpose of steering interventions is to stabilize the vehicle. The steering interventions can be combined with the interventions of the standard ESP system 100 in this regard. Moreover, the steering interventions can render an ESP intervention unnecessary that is distinctly noticeable for the operator, or at least make it become necessary only at a later point of time.

A preferred embodiment of the driving dynamics controller, which is employed for performing the steering interventions, is described in detail in the following.

Figure 3:
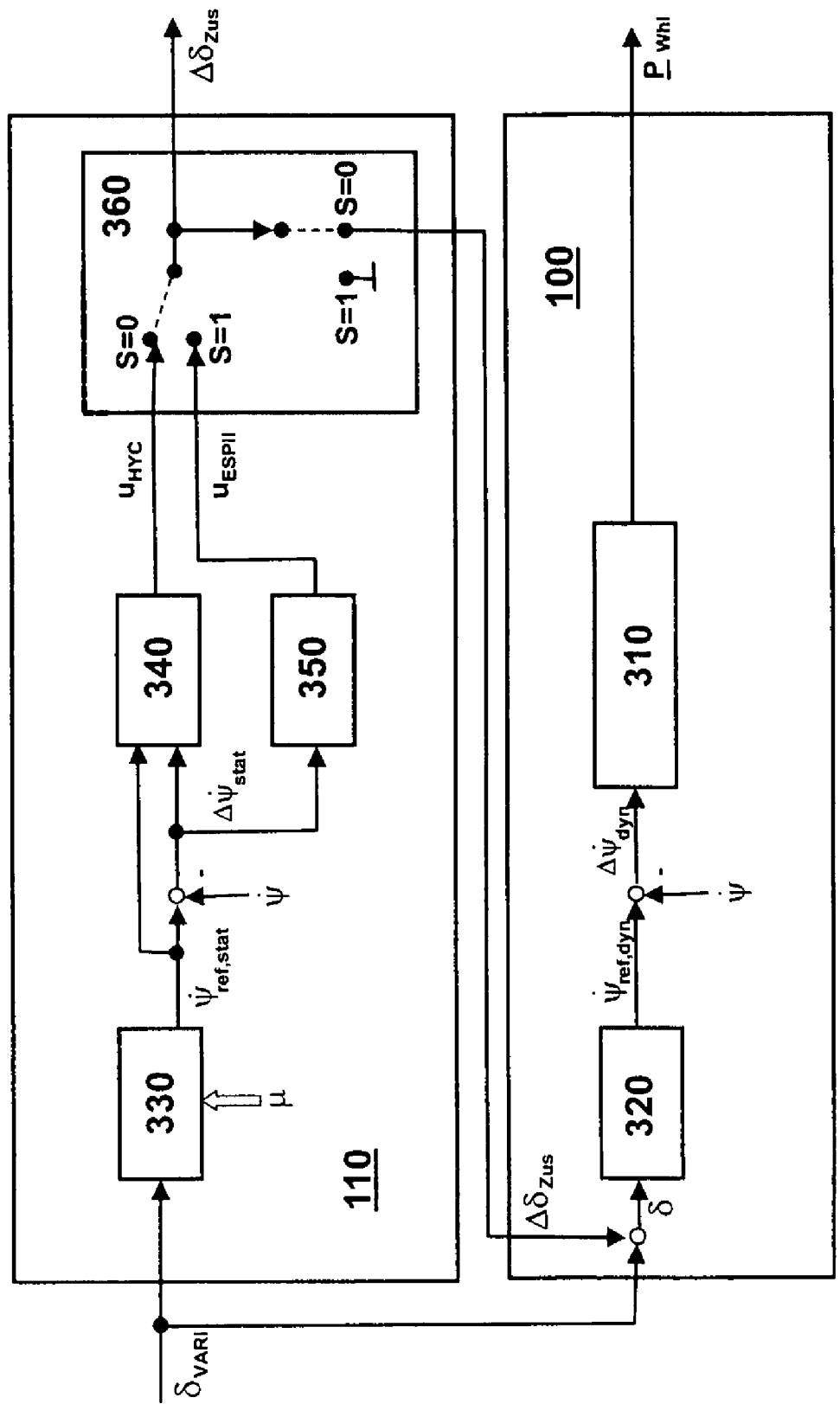
FIG. 3 is another block diagram of a control system for driving dynamics control with a standard ESP system and a control system for determining and adjusting an additional steering angle.

The control system 110 is illustrated once more together with the standard ESP system in a block diagram in FIG. 3.

A complete illustration of the per se known standard ESP system 100 is, however, obviated again. What is shown is a controller 310 only (not specified in detail), which is designed in a fashion known to the expert in the art and calculates the output variable of the standard ESP system 100. In addition, the block 320 for calculating the reference yaw rate $\dot{\Psi}_{ref,dyn}$ is shown.

The control system 110 comprises a block 330 for calculating the reference yaw rate $\dot{\Psi}_{ref,stat}$. The latter represents the command variable for the controllers in the blocks 340 and 350, of which the controller in block 340 determines the correcting variable $u_{HYC}$, which is transmitted in the range of handling as an additional steering angle request $\Delta\delta_{Zus}$ to the steering actuator. In block 350, the correcting variable $u_{ESPII}$ is established, which is transmitted to the steering actuator as an additional steering angle request $\Delta\delta_{Zus}$ in the range of critical driving conditions.

Block 360 contains the activation logic, which enables the controller in block 340 or the controller in block 350 corresponding to the prevailing driving condition.

The detection of the prevailing driving condition or the allocation of the prevailing driving condition to a driving condition range preferably takes place within the standard ESP system 110, which furnishes the activation logic with the flag S that indicates, whether the prevailing driving condition is in the range of handling or in the range of critical driving conditions.

As has been explained hereinabove, flag S is preferably determined by comparing the magnitude of the yaw rate deviation $\Delta\dot{\Psi}_{dyn}$ with a predetermined threshold value. In addition, it is also possible to compare the magnitude of the sideslip angle velocity $\dot{\beta}$ and/or the magnitude of the lateral acceleration $a_y$ with respectively one predetermined threshold value.

The yaw rate deviation $\Delta\dot{\Psi}_{dyn}$ refers to the difference between the actual yaw rate $\dot{\Psi}$ of the vehicle and the reference yaw rate $\dot{\Psi}_{ref,dyn}$, which is calculated in a dynamic vehicle model in block 320.

Preferably, a linear single-track model is concerned, with the known system equations $$\dot{\beta} = c_{11}\frac{\beta}{v} - \dot{\psi} + c_{12}\frac{\dot{\psi}}{v^2} + c_{13}\frac{\delta}{v} \qquad (1)$$

$$\ddot{\psi} = c_{21}\beta + c_{22}\frac{\dot{\psi}}{v} + c_{23}\delta$$

wherein $\ddot{\Psi}$ designates the yaw acceleration. The sideslip angle $\beta$ and the yaw rate $\dot{\Psi}$ represent the condition variables of the system. The input variable is a steering angle, which is herein referred to as $\delta$ in the generic form and which will be dealt with in detail in the following. Due to the influence of the input variable, the yaw rate $\dot{\Psi}_{ref,dyn}$ is achieved as an output variable as a solution of equation 1.

The coefficients in equation 1 are given by $$c_{11} = -\frac{c_h + c_v}{m} \quad c_{12} = \frac{c_h l_h - c_v l_v}{m} \quad c_{13} = \frac{c_v}{m}$$

$$c_{21} = \frac{c_h l_h - c_v l_v}{\Theta} \quad c_{22} = -\frac{c_h l_h^2 - c_v l_v^2}{\Theta} \quad c_{23} = \frac{c_v l_v}{\Theta}$$

wherein $c_h$ and $c_v$ represent the rigidities at the rear and front axles that result from the tire, wheel suspension and steering elasticity, $l_h$ and $l_v$ are the distances of the rear and front axles from the vehicle's center of gravity, m refers to the vehicle mass, and $\Theta$ designates the inertia moment of the vehicle with regard to its vertical axis.

A value of S=1 is calculated for flag S, when the magnitude of the yaw rate deviation $\Delta\dot{\Psi}_{dyn}$ is in excess of the predetermined threshold value. Besides, additional conditions for the fact that a value of S=1 is calculated can be represented by the requirements that the magnitude of the sideslip angle velocity $\dot{\beta}$ and/or the magnitude of the lateral acceleration $a_y$ exceed in each case a predetermined threshold value. In this respect, it is not absolutely required that the conditions are satisfied cumulatively, they may also be OR-operated. If the envisaged conditions are not satisfied, the flag will adopt the value S=0.

With a value of S=0, a driving condition in the range of handling prevails, and the activation logic in block 360 enables the controller in block 340. As this occurs, the correcting variable $u_{HYC}$ established by the controller is transmitted to the steering actuator as an additional steering angle request $\Delta\delta_{Zus}$.

At a value of S=1 a driving condition in the range of critical driving conditions prevails, and the standard ESP system 110 is activated. In this case, the controller in block 350 is enabled by the activation logic so that the correcting variable $u_{ESPII}$ established in this controller is transmitted to the steering actuator as an additional steering angle request $\Delta\delta_{Zus}$.

In order not to jeopardize the agility gained in the range of handling by unwanted braking and engine interventions of the activated standard ESP system 110, it is furthermore arranged that the reference yaw rate $\dot{\Psi}_{ref,dyn}$ in the range of handling is calculated from a sum of the steering angle $\delta_{VARI}$ and the additional steering angle $\Delta\delta_{Zus}$. Therefore, the steering angle $\delta = \delta_{VARI} + \Delta\delta_{Zus}$ in the range of handling is the input variable of block 320 for the calculation of this reference yaw rate. In the range of critical driving conditions, however, exclusively the steering angle $\delta_{VARI}$ is used as an input variable $\delta$ of this block, in particular in order to avoid oscillations of the control circuit, which could impair a stabilization of the vehicle.

As illustrated in FIG. 3, the additional steering angle signal $\Delta\delta Zus$ at a value of S=1 is therefore fed back into the standard ESP system 110 by way of the activation logic in block 360. The feedback is interrupted at a value S=0, i.e. in the range of critical driving conditions.

Figure 4:
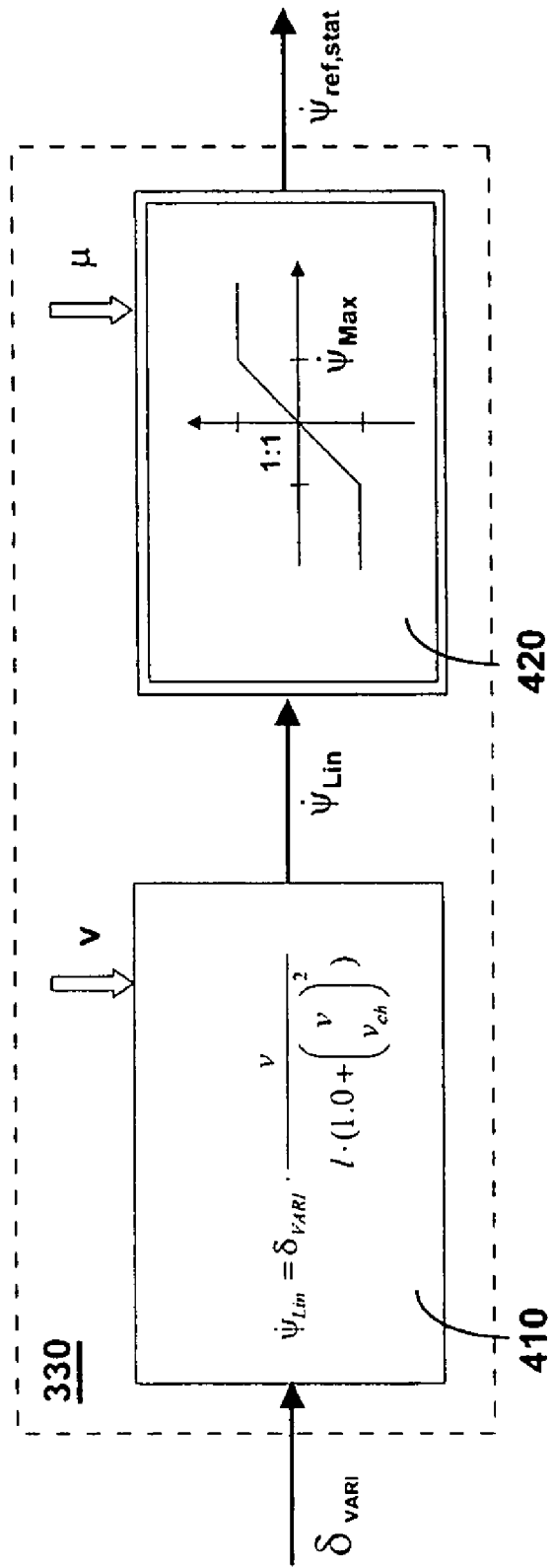
FIG. 4 is a block diagram for illustrating the calculation of the reference yaw rate in the steady-state vehicle model within the control system for determining the additional steering angle.

The determination of the reference yaw rate $\dot\Psi_{ref,stat}$, which serves as a command variable of the controllers for the calculation of additional steering angles in blocks 350 and 360, is now explained by way of FIG. 4 showing a preferred embodiment of block 330.

The calculation is performed on the basis of a steady-state vehicle model, preferably a stationary linear single-track model, and a limitation of the reference yaw rate $\dot\Psi_{ref,stat}$ is additionally performed depending on an estimated coefficient of friction $\mu$ between the tires and the roadway.

Accordingly, block 330 includes a linear block 410 for the calculation of a yaw rate $\dot\Psi_{Lin}$ as well as a non-linear block 420 for the limitation of the yaw rate $\dot\Psi_{Lin}$, with the limited yaw rate $\dot\Psi_{Lin}$ corresponding to the reference yaw rate $\dot\Psi_{ref,stat}$.

The calculation of the yaw rate $\dot\Psi_{Lin}$ in the linear block 410 is performed by way of the following known relation of the stationary linear single-track model from the steering angle $\delta_{VARI}$ and the vehicle velocity v representing the input variables of block 410:

$$\dot\psi_{Lin} = \delta_{VARI} \cdot \frac{v}{l \cdot (1+(v/v_{ch})^2)} \quad (2)$$

The wheel base l of the vehicle and the characteristic velocity $v_{ch}$ are invariable parameters of the vehicle, and their values are stored in block 410. The characteristic velocity $v_{ch}$ is the result of $$v_{ch} = \sqrt{\frac{l^2 \cdot c_v \cdot c_h}{m \cdot (c_h \cdot l_h - c_v \cdot l_v)}} \quad (3)$$

In contrast to the dynamic vehicle model according to equation 1, the transition behavior from straight travel into circular travel is not taken into consideration in the steady-state vehicle model, which is determined in particular by the moment of inertia $\ominus$ and the lateral rigidities $c_h$ and $c_v$. Thus, the model represents an idealized vehicle that reacts without deceleration to steering motions.

In block 420, the yaw rate $\dot\Psi_{Lin}$ is limited to values, which are physically appropriate, i.e. which can indeed be realized on the prevailing underground. The underground is then characterized by way of the coefficient of friction $\mu$, which is calculated or estimated, for example, in the way described in German published patent application DE 195 15 059 A1, to which reference is made in this context.

The maximum amount of the yaw rate $\dot\Psi_{Lin}$ is preferably given by the value $$|\dot\psi_{max}| = \frac{\mu \cdot g}{v} \quad (4)$$

with g referring to the acceleration due to gravity. If the absolute value of the yaw rate signal $\dot\Psi_{Lin}$ is lower than this value, the signal is thus not modified in block 420. If, however, the absolute value is higher than this value, a limitation to this value will take place, while the sign of the yaw rate $\dot\Psi_{Lin}$ is maintained.

The reference yaw rate $\dot\Psi_{ref,stat}$ which is used as a command variable in driving dynamics control, results as an output signal of block 420 or block 330, respectively. According to the invention, two controllers are employed in blocks 340 and 350, which determine the correcting variables $u_{HYC}$ and $u_{ESPII}$.

Figure 5:
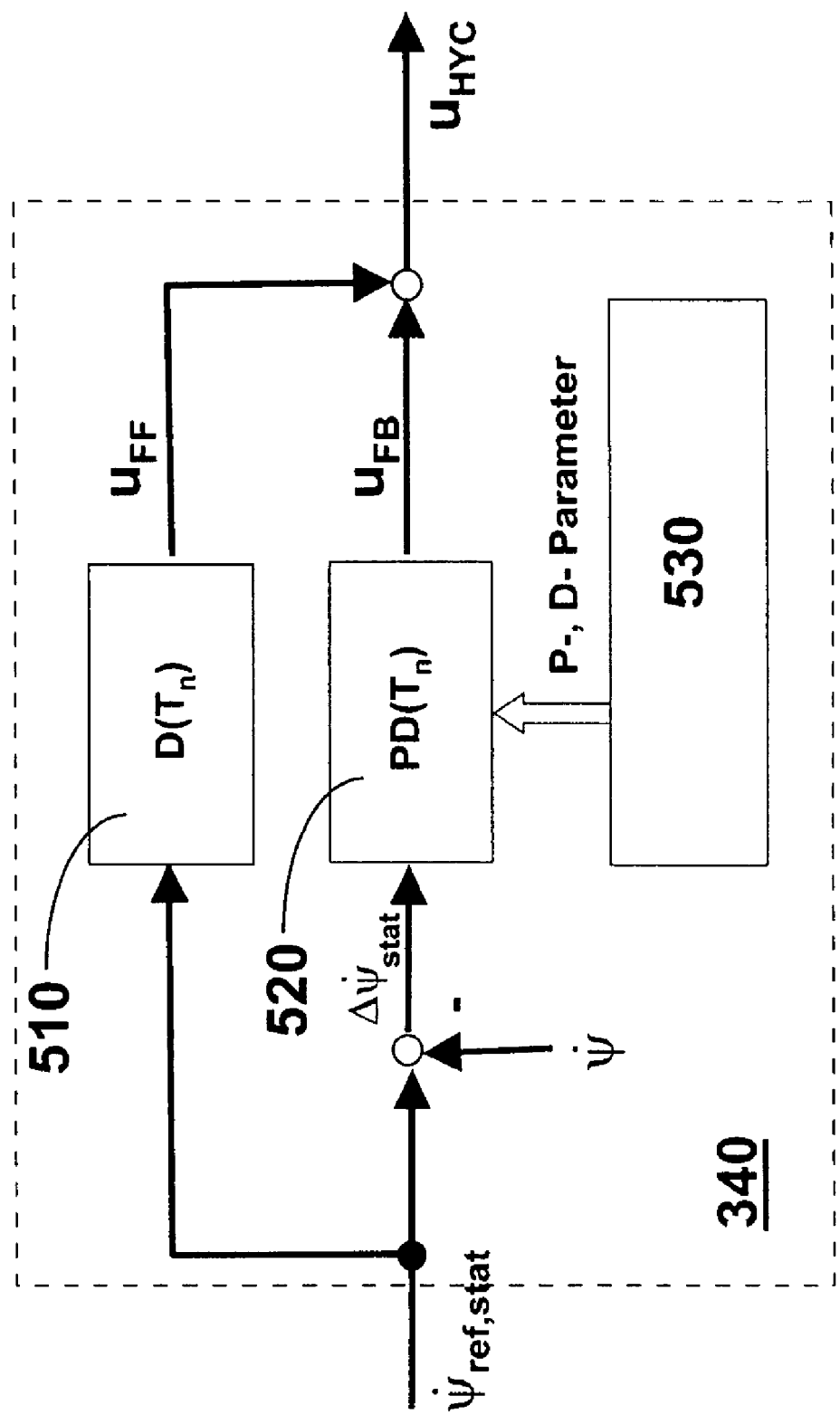
FIG. 5 is a block diagram of a controller for determining a correcting variable, which corresponds to the request for an additional steering angle in the range of handling.

FIG. 5 illustrates a preferred embodiment of the controller in block 340, which establishes the correcting variable $u_{HYC}$. The controller comprises a closed-loop control member 510 and an open loop-feedback control element 520 in this embodiment.

In the closed-loop control member 510, the closed-loop control portion $u_{FF}$ of the correcting variable $u_{HYC}$ is derived directly from the command variable $\dot\Psi_{ref,stat}$. Due to this pilot control it is possible to achieve the high dynamics demanded in the range of handling in order to effectively improve the vehicle performance following the control intervention.

Preferably, the closed-loop control member 510 is designed as a differentiating member with a delay character (D-$T_n$-member) In particular, it can be a precautionary member (D-$T_1$-member), where the control law $$K_{FF} \cdot \frac{du_{FF}}{dt} + u_{FF} = K_{FF} \cdot T_{FF} \cdot \frac{d\dot\psi_{ref,stat}}{dt} \quad (5)$$

applies, with $K_{FF}$ and $T_{FF}$ referring to controller parameters.

In block 520, the controlling portion $u_{FB}$ of the correcting variable $u_{HYC}$ is established from the control deviation $\Delta\dot\Psi_{stat} = \dot\Psi_{ref,stat} - \dot\Psi$, that is the difference between the stationary reference yaw rate $\dot\Psi_{ref,stat}$ and the measured actual yaw rate $\dot\Psi$ of the vehicle. Preferably, the control element 520 is configured as a proportional controller with a differential component (P-D-controller or P-D-$T_n$-controller, respectively), wherein a control law according to the form of $$u_{FB} = K \cdot \Delta\dot\psi_{stat} + T_d \cdot \frac{d\Delta\dot\psi_{stat}}{dt}. \quad (6)$$

applies. The controller parameters K and $T_d$ are preferably not invariably predetermined, but allow being adapted by an adaptation mechanism in block 530 to the current vehicle condition and to defined operational parameters of the vehicle. The controller parameters can be calculated differently e.g. depending on the vehicle velocity v and/or the brake pressure $P_{Drv}$ set by the operator. As has been described before, it is also possible then to carry out an adaptation to the load condition of the vehicle and/or to the degree of wear of chassis elements.

The correcting variable $u_{HYC}$ is achieved as the sum of the closed-loop control portion $u_{FF}$ and the open-loop control portion $u_{FB}$, and the controllers are so designed that the closed-loop control portion $u_{FF}$ has a larger share in the sum than the open-loop control portion $u_{FB}$ and decisively determines the value of the correcting variable $u_{HYC}$.

Figure 6:
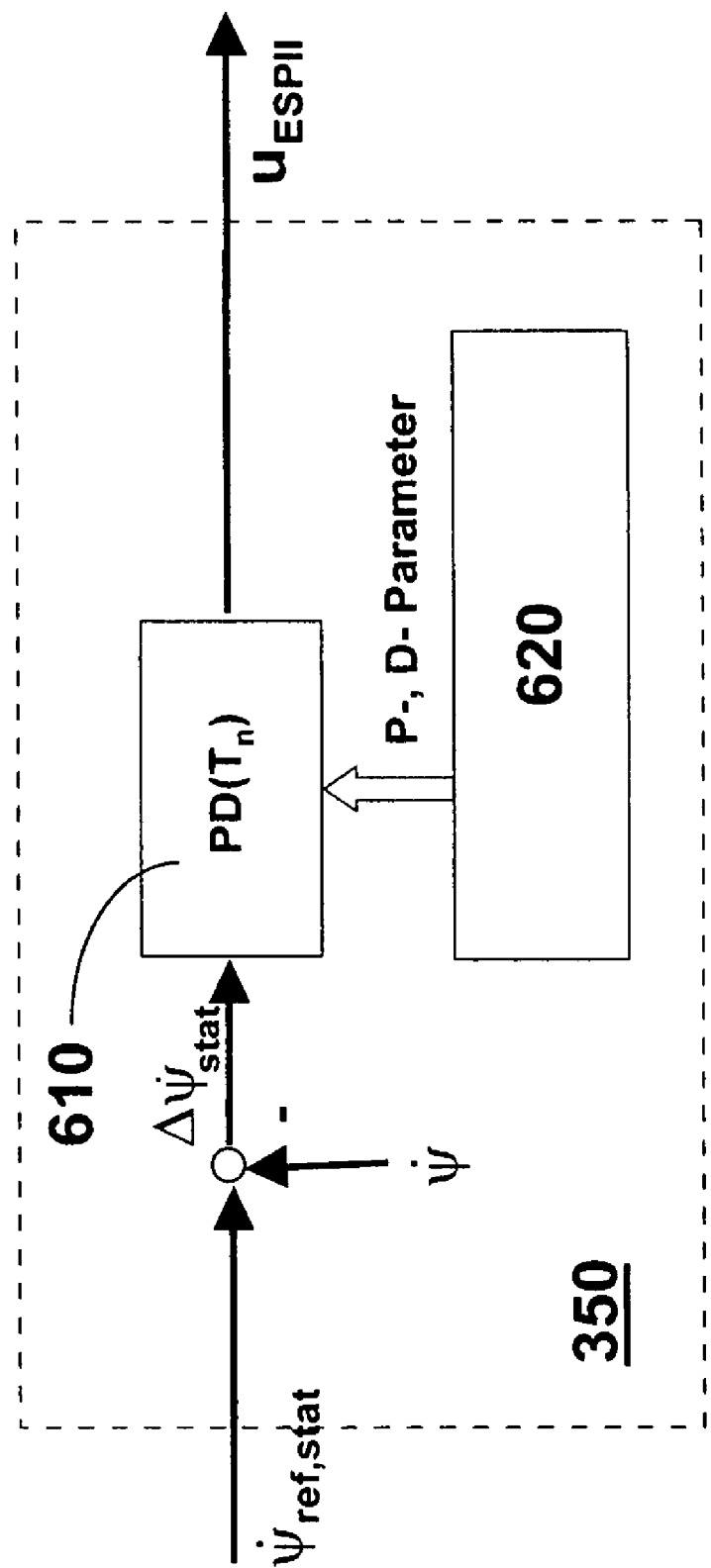
FIG. 6 is a block diagram of a controller for determining a correcting variable, which corresponds to the request for an additional steering angle in the range of critical driving conditions.

A preferred embodiment of block 350 for determining the correcting variable $u_{ESPII}$, which is transmitted as an additional steering angle request $\Delta\delta_{Zus}$ to the steering actuator in critical driving situations, is shown in a block diagram in FIG. 6. In this embodiment, block 360 comprises a controller 610, which is preferably designed as a P-D-controller or as a P-D-$T_n$-controller, in which a control law according to $$u_{ESPII} = K' \cdot \Delta\dot{\psi}_{stat} + T'_d \cdot \frac{d\Delta\dot{\psi}_{stat}}{dt} \qquad (6)$$

applies, which is similar to equation 6. In this case, too, the controller parameters K' and T'$_d$ can be adapted by an adaptation mechanism in block 620, as has been described hereinabove, to the driving condition and to different operational parameters of the vehicle.

The invention claimed is:

1. A device for controlling the driving dynamics of a vehicle, with at least one sensor establishing at least one driving condition variable ($\dot{\Psi}$, $\beta$, $a_y$) representative of a driving condition and with a driving dynamics controller for determining an additional steering angle to be superimposed on a steering motion commanded by an operator,
wherein the driving dynamics controller (100, 110) comprises at least two control units (340, 350), which are respectively associated with one of at least two driving condition ranges,
wherein it includes a determinator determining a prevailing driving condition range based on the at least one driving condition variable ($\dot{\Psi}$, $\beta$, $a_y$), and wherein it includes an activation logic (360) which is connected to the determinator and to the at least two control units and which activates the respective control unit (340, 350) associated with the established driving condition range.

2. The device as claimed in claim 1,
wherein one of the at least two control units (340) of the driving dynamics controller (100, 110) is associated with a range of non-critical handling, and another control unit (350) of the driving dynamics controller (100, 110) is associated with a range of critical driving conditions.

3. The device as claimed in claim 1,
wherein a first of the at least two control units (340) comprises a pilot control component (510), in which a closed-loop control portion ($u_{FF}$) of the additional steering angle ($\Delta\delta_{Zus}$) can be determined depending on a yaw rate reference value ($\dot{\Psi}_{ref,stat}$) established in a first vehicle model.

4. The device as claimed in claim 3,
wherein the first vehicle model is a steady-state vehicle model.

5. The device as claimed in claim 3,
wherein the first control unit (340) comprises a control component (520), which determines an open-loop control portion ($u_{FB}$) of the additional steering angle ($\Delta\delta_{Zus}$) depending on a difference between a yaw rate actual value ($\dot{\Psi}$) and the yaw rate reference value ($\dot{\Psi}_{Stat}$) that is established in the first vehicle model.

6. The device as claimed in claim 3,
wherein the additional steering angle ($\Delta\delta_{Zus}$) that can be determined by the first control unit (340) is a sum of a closed-loop control portion ($u_{FF}$) and an open-loop-control portion ($u_{FB}$), with the closed-loop control portion ($u_{FF}$) having a larger share in the sum than the open-loop-control portion ($u_{FB}$).

7. The device as claimed in claim 1,
wherein a second of the at least two control units (350) comprises a control component (610), in which a open-loop-control portion ($u_{ESPII}$) of the additional steering angle ($\Delta\delta_{Zus}$) is determined depending on a difference between an actual value of the vehicle yaw rate ($\dot{\Psi}$) and a yaw rate reference value ($\dot{\Psi}_{ref,stat}$, $\dot{\Psi}_{ref,dyn}$).

8. The device as claimed in claim 7,
wherein the second control unit uses a second vehicle model, which is a dynamic reference model.

9. The device as claimed in claim 1,
wherein it comprises a third control unit (310), which determines an additional longitudinal force to be applied through brake force or an additional engine torque of the vehicle depending on a difference between an actual value of the vehicle yaw rate ($\dot{\Psi}$) and a yaw rate reference value ($\dot{\Psi}_{ref,stat}$, $\dot{\Psi}_{ref,dyn}$).

10. The device as claimed in claim 9,
wherein the third control unit uses a second vehicle model, which is a dynamic reference model.

11. The device as claimed in claim 1,
wherein the determinator means determines the prevailing driving condition based on a comparison between a deviation of at least one actual value ($\dot{\Psi}$, $\beta$, $a_y$) of the at least one driving condition variable ($\dot{\Psi}$, $\beta$, $a_y$) from a reference value ($\dot{\Psi}_{ref,dyn}$, $\dot{\Psi}_{ref,stat}$) and at least one predetermined first threshold value and based on a comparison between at least one actual value of the driving condition variable ($\dot{\Psi}$, $\beta$, $a_y$) and at least one predetermined second threshold value.

12. The device as claimed in claim 11,
wherein the determinator determines a driving condition in the range of non-critical handling when at least one of the following conditions is met:
a) the magnitude of the deviation between the actual value of the at least one driving condition variable ($\dot{\Psi}$, $\beta$, $a_y$) and the reference value ($\dot{\Psi}_{ref,dyn}$) is lower than the predetermined first threshold value
b) the magnitude of the driving condition variable ($\dot{\Psi}$, $\beta$, $a_y$) is lower than the predetermined second threshold value.

13. The device as claimed in claim 11,
wherein the determinator determines a driving condition in the range of critical driving conditions when at least one of the following conditions is met:
a) the magnitude of the difference between the actual value of the at least one driving condition variable ($\dot{\Psi}$, $\beta$, $a_y$) and the reference value ($\dot{\Psi}_{ref,dyn}$) is higher than the predetermined first threshold value;
b) the magnitude of the driving condition variable ($\dot{\Psi}$, $\beta$, $a_y$) exceeds the predetermined second threshold value.

14. The device as claimed in claim 11,
wherein the reference value ($\dot{\Psi}_{ref,dyn}$) is calculated in the second vehicle model.

15. The device as claimed in claim 11,
wherein the reference value ($\dot{\Psi}_{ref,dyn}$) is calculated depending on a composite steering angle sum of the steering angle ($\delta_{Drv}$, $\delta_{VARI}$) set by the operator and the additional steering angle ($\Delta\delta_{Zus}$).

16. A method of controlling the driving dynamics of a vehicle by establishing an additional steering angle, according to which a steering motion is carried out in addition to the steering motion commanded by an operator, the method comprising the following steps:
sensing a driving condition variable representative of a driving condition, determining the additional steering angle ($\Delta\delta$hd Zus) in at least two control units (340, 350), each of which being respectively associated with one of at least two driving condition ranges, determining a prevailing driving condition range based on the driving condition variable ($\dot{\Psi}$, $\dot{\beta}$, $a_y$), enabling the respective control unit (440, 450), which is associated with the established prevailing driving condition range.

17. The method as claimed in any one of claim 16, wherein in a driving condition range of non-critical handling, the additional steering angle is determined by determining a closed-loop control portion ($u_{FF}$) of the additional steering angle in direct dependency on a yaw rate reference value $\dot{\Psi}_{ref,stat}$) based on a static vehicle model.

18. The method as claimed in any one of claim 17, wherein in a driving condition range of non-critical handling, the additional steering angle is determined by additionally determining an open-loop control portion ($u_{FB}$) of the additional steering angle in dependency on a difference between an actual value of the vehicle yaw rate and the yaw rate reference value ($\dot{\Psi}_{ref,stat}$) based on the static vehicle model, the open-loop control portion being smaller than the closed-loop control portion.

19. The method as claimed in any one of claim 16, wherein in the range of critical driving conditions, the additional steering angle is determined by calculating an open-loop control portion ($u_{ESPII}$) of the additional steering angle ($\Delta\delta_{Zus}$) depending on a difference between an actual value of the vehicle yaw rate ($\dot{\Psi}$) and a yaw rate reference value ($\dot{\Psi}_{ref,stat}$, $\dot{\Psi}_{ref,dyn}$), with the yaw rate reference value ($\dot{\Psi}_{ref,stat}$, $\dot{\Psi}_{ref,dyn}$) being based on a dynamic vehicle model.

20. The method as claimed in claim 16, comprising the additional step of determining an additional longitudinal force depending on a difference between the yaw rate actual value ($\dot{\Psi}$) and the yaw rate reference value ($\dot{\Psi}_{ref,dyn}$) that is established in a dynamic vehicle model.

\* \* \* \* \*